(12) United States Patent
Tobin

(10) Patent No.: US 10,679,213 B2
(45) Date of Patent: Jun. 9, 2020

(54) SYSTEMS, METHODS, AND COMPUTER PROGRAM PRODUCTS FOR USING PROXY ACCOUNTS

(71) Applicant: PAYPAL, INC., San Jose, CA (US)

(72) Inventor: John Patrick Edgar Tobin, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 808 days.

(21) Appl. No.: 14/796,649

(22) Filed: Jul. 10, 2015

(65) Prior Publication Data

US 2015/0310429 A1    Oct. 29, 2015

Related U.S. Application Data

(63) Continuation of application No. 13/482,425, filed on May 29, 2012, now Pat. No. 9,105,021, which is a
(Continued)

(51) Int. Cl.
*G06Q 20/38* (2012.01)
*G06Q 20/22* (2012.01)
(Continued)

(52) U.S. Cl.
CPC ........... *G06Q 20/385* (2013.01); *G06Q 20/20* (2013.01); *G06Q 20/202* (2013.01); *G06Q 20/22* (2013.01);
(Continued)

(58) Field of Classification Search
CPC .... G06Q 20/385; G06Q 20/20; G06Q 20/202; G06Q 20/227; G06Q 20/32; G06Q 20/322; G06Q 20/3278; G06Q 20/3821; G06Q 20/405; G06Q 20/36; G06Q 20/367; G06Q 20/401
(Continued)

(56) References Cited

U.S. PATENT DOCUMENTS 6,422,462 B1    7/2002 Cohen
6,988,657 B1    1/2006 Singer et al.
(Continued)

FOREIGN PATENT DOCUMENTS

WO    WO 2010126509 A2    11/2010

OTHER PUBLICATIONS

PayPal Student Accounts, printed from "https://student.paypal.com/us/cgi-bin/marketingweb?cmd=/render-content&content/ID=marketing/us/student/accounts," printed Mar. 14, 2012, 4 pages.

*Primary Examiner* — James D Nigh
(74) *Attorney, Agent, or Firm* — Haynes and Boone, LLP

(57) ABSTRACT

An electronic device including an input/output interface operable to receive an input from a user and communicate an output to the user, a transceiver operable to electronically communicate with a computer network, a computer processor operable to execute instructions, and a memory storage operable to store the instructions, the memory storage further comprising a program module that is operable to: receive credentials for a proxy payment account, where the proxy payment account is linked to a primary payment account and not linked directly to a method of payment underlying the primary payment account, and make payment at a Point of Sale (POS) using the received credentials.

20 Claims, 8 Drawing Sheets

Related U.S. Application Data continuation-in-part of application No. 13/420,888, filed on Mar. 15, 2012, now abandoned.

(51) Int. Cl.

| | |
|---|---|
| *G06Q 20/32* | (2012.01) |
| *G06Q 20/40* | (2012.01) |
| *G06Q 20/20* | (2012.01) |
| *G06Q 20/36* | (2012.01) |

(52) U.S. Cl.
CPC ........... *G06Q 20/227* (2013.01); *G06Q 20/32* (2013.01); *G06Q 20/322* (2013.01); *G06Q 20/3278* (2013.01); *G06Q 20/3821* (2013.01); *G06Q 20/405* (2013.01); *G06Q 20/36* (2013.01); *G06Q 20/367* (2013.01); *G06Q 20/401* (2013.01)

(58) Field of Classification Search
USPC .......................................................... 705/76
See application file for complete search history.

(56) References Cited

U.S. PATENT DOCUMENTS

| | | | |
|---|---|---|---|
| 7,555,460 B1 | 6/2009 | Barkan | |
| 7,761,380 B2 | 7/2010 | Katz | |
| 8,112,353 B2 | 2/2012 | Li et al. | |
| 8,549,279 B1 | 10/2013 | Sahasranaman et al. | |
| 8,682,802 B1 | 3/2014 | Kannanari | |
| 8,812,395 B2 * | 8/2014 | Webber | G06Q 30/0601 705/35 |
| 9,655,787 B2 | 5/2017 | Wilson et al. | |
| 2002/0002538 A1 | 1/2002 | Ling | |
| 2005/0097060 A1 | 5/2005 | Lee et al. | |
| 2007/0192245 A1 | 8/2007 | Fisher et al. | |
| 2008/0103923 A1 | 5/2008 | Rieck et al. | |
| 2008/0283591 A1 | 11/2008 | Oder et al. | |
| 2009/0070260 A1 * | 3/2009 | Flitcroft | G06Q 20/00 705/41 |
| 2009/0134217 A1 | 5/2009 | Flitcroft et al. | |
| 2009/0240620 A1 | 9/2009 | Kendrick et al. | |
| 2009/0271287 A1 | 10/2009 | Halpern | |
| 2009/0294527 A1 | 12/2009 | Brabson et al. | |
| 2010/0030697 A1 | 2/2010 | Goodrich et al. | |
| 2010/0094755 A1 | 4/2010 | Kloster | |
| 2010/0257612 A1 | 10/2010 | McGuire et al. | |
| 2011/0161233 A1 | 6/2011 | Tieken | |
| 2011/0178884 A1 | 7/2011 | Teicher et al. | |
| 2011/0208659 A1 | 8/2011 | Easterly et al. | |
| 2011/0251892 A1 | 10/2011 | Laracey | |
| 2011/0295753 A1 * | 12/2011 | Reno | G06Q 20/40 705/72 |
| 2011/0307710 A1 | 12/2011 | McGuire et al. | |
| 2011/0320344 A1 | 12/2011 | Faith et al. | |
| 2012/0005038 A1 | 1/2012 | Soman | |
| 2012/0041881 A1 | 2/2012 | Basu et al. | |
| 2012/0078782 A1 | 3/2012 | Schoenberg et al. | |
| 2012/0203700 A1 | 8/2012 | Ornce et al. | |
| 2012/0226611 A1 * | 9/2012 | Radia | G06Q 20/02 705/44 |
| 2012/0254959 A1 * | 10/2012 | Schmidt | H04L 63/061 726/6 |
| 2012/0259781 A1 | 10/2012 | Fote et al. | |
| 2012/0259782 A1 | 10/2012 | Hammad | |
| 2012/0267432 A1 | 10/2012 | Kuttuva | |
| 2012/0317036 A1 | 12/2012 | Bower et al. | |
| 2013/0031006 A1 | 1/2013 | McCullagh et al. | |
| 2013/0091061 A1 | 4/2013 | Caulkett et al. | |
| 2013/0097081 A1 | 4/2013 | Leavitt et al. | |
| 2013/0110658 A1 | 5/2013 | Lyman et al. | |
| 2013/0275308 A1 | 10/2013 | Paraskeva et al. | |
| 2014/0032419 A1 | 1/2014 | Anderson et al. | |
| 2015/0287021 A1 * | 10/2015 | Itwaru | G06Q 20/3276 705/44 |
| 2016/0314531 A1 * | 10/2016 | Dangott | G06Q 40/02 |

* cited by examiner

SYSTEMS, METHODS, AND COMPUTER PROGRAM PRODUCTS FOR USING PROXY ACCOUNTS

REFERENCE TO RELATED APPLICATIONS

This application is a continuation of U.S. Ser. No. 13/482,425 filed May 29, 2012, which is continuation-in-part of U.S. Ser. No. 13/420,888 filed Mar. 15, 2012, the entire disclosures of which are incorporated herein by reference.

BACKGROUND

Technical Field

The present disclosure generally relates to electronic transactions, and more particularly, to techniques for using proxy accounts associated with a primary account.

Related Art

It is common for consumers and businesses to have electronic accounts to send and receive payments from other parties. One example includes credit cards, which are typically read electronically and transfer money electronically. Another example is a payment service, such as that offered under the name PayPal™, which provides electronic wallets that users can link to credit cards, bank accounts, and any other form of payment.

One problem with most methods of payment, whether electronic or otherwise, is that it can be prone to fraud. For instance, it is not uncommon for criminals to steal credit card information and then to attempt to use the credit card information to pay for goods and services. A typical, modern credit card theft scenario involves a consumer's card that is compromised in some fashion and then canceled and replaced by the card issuer relatively quickly.

While the consumer is not typically obliged to pay for the criminal's purchases, the consumer still feels some inconvenience. For instance, most consumers store credit card information at multiple vendors and may even use a card to make automatic payments toward one or more bills. But when the credit card is suddenly canceled and replaced, the consumer is in the position of having to change the stored information for a variety of vendors and may even miss one or more scheduled payments set up on the old card.

Furthermore, when a user of an account employs the account for making payments to many different entities, it can be quite difficult to determine exactly how an account was compromised because multiple entities have been exposed to the account's credentials. There is currently no convenient solution to protect the integrity of an account while still allowing easy payment.

SUMMARY

One of the broader forms of the present disclosure involves an electronic device including an input/output interface operable to receive an input from a user and communicate an output to the user, a transceiver operable to electronically communicate with a computer network, a computer processor operable to execute instructions, and a memory storage operable to store the instructions, the memory storage further comprising a program module that is operable to: receive credentials for a proxy payment account, where the proxy payment account is linked to a primary payment account and not linked directly to a method of payment underlying the primary payment account, and make payment at a Point of Sale (POS) using the received credentials.

Another one of the broader forms of the present disclosure involves a method including at a mobile device, receiving credentials for a proxy payment account associated with a primary payment account, wherein the primary payment account is linked to a method of payment, further wherein the proxy payment account is linked to the primary account but is not linked directly to the method of payment, wherein payments to and from the proxy payment account are cleared through the primary account, and making payment for a transaction by passing the received credentials to a POS.

Another one of the broader forms of the present disclosure involves a computer program product having a computer readable medium tangibly recording computer program logic for managing electronic payment, the computer program product including: code to generate an electronic user interface on a mobile computing device for managing electronic payment, code to receive input from a user, via the user interface, indicating a request to use a proxy payment account for payment at a POS, code to receive credentials for the proxy payment account at the mobile computing device, the proxy payment account being linked to a primary payment account and to a payment method through the primary payment account, the proxy payment account not being directly linked to the payment method, and code to pass the received credentials to the POS from the mobile computing device.

DETAILED DESCRIPTION

Figure 1:
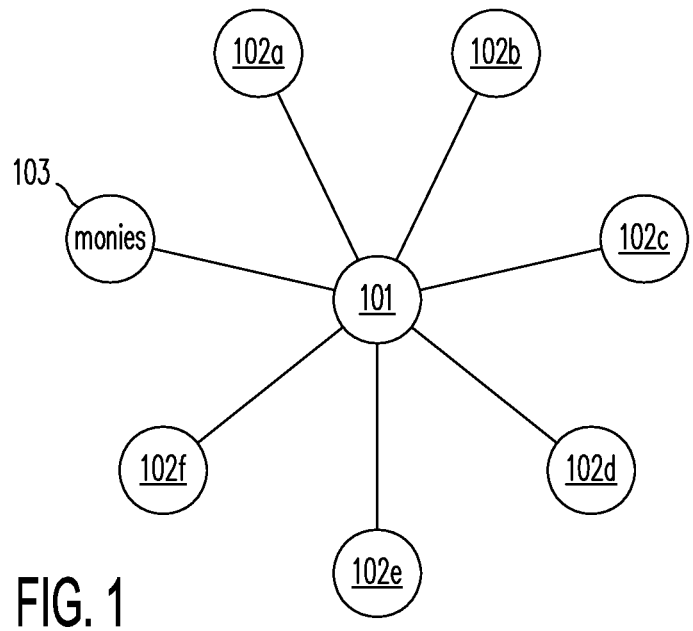
FIG. 1 illustrates an example relationship between a primary payment account and a multitude of proxy payment accounts.

It is to be understood that the following disclosure provides many different embodiments, or examples, for implementing different features of the present disclosure. Specific examples of components and arrangements are described below to simplify the present disclosure. These are, of course, merely examples and are not intended to be limiting.

According to the various aspects of the present disclosure, a method, system, and computer program product are discussed below that improve electronic payment accounts.

In one example, an owner (e.g., a consumer or business) has a primary payment account and many proxy payment accounts that are targeted to individual vendors and have restrictive financial rules amendable by the owner of the primary account. Each proxy account is linked to the primary account, and withdrawals/deposit are from/to the proxy account via the primary account.

One purpose of the proxy accounts is to provide more security about who can withdraw from the account. Thus, in one example, rules are created for each of the proxy accounts specifying payments to/from a single counterparty. In this example, counterparties are payees and payors with respect to the account owner. From another aspect, a purpose of the proxy accounts is to provide greater control of inbound and outbound money. Proxy accounts can be created and destroyed easily by the owner. If primary account information is stolen for a proxy account, when the owner is notified, the owner can quickly cancel and replace the proxy account with a new proxy account. The primary account containing the monies is uncompromised. And in a scenario wherein transactions with the proxy account are limited by rules specifying a maximum transaction size, the primary account may be unharmed, or at worst, harmed within limits set up for the proxy account.

Also, each proxy account can be associated with one or more counterparties, where each counterparty is not exposed to the credentials of the primary account or to other proxy accounts not associated with that counterparty. In such an arrangement, when a counterparty is compromised itself or leaks proxy account information the owner can quickly identify the counterparty responsible. Thus, proxy accounts can not only be used to prevent or limit damage from theft, but proxy accounts can also be used to assist investigations in focusing on a particular instance of compromise. Additionally, when the account owner sets up a system wherein each counterparty is associated with a particular proxy account, tracking payments to/from the counterparty may be simplified, since the payments would be associated with a specific account for that counterparty.

Continuing with the example, an account owner may establish any arbitrary rule or set of rules for a given proxy account. Examples of rules include, e.g., limitations regarding how much a proxy account can distribute in a certain time period, which counterparties are associated with the proxy account, a maximum lifetime for the proxy account, a one-time use lifespan, and the like.

The concept disclosed above encompasses a variety of other uses. For instance, a parent may create a proxy account for a child. The concept can also be extended to credit cards and electronic wallets to provide a security buffer from a primary account and can be extended further to allow proxy account balances.

FIG. 1 is an illustration of a primary account and multiple proxy accounts, adapted according to one embodiment. Primary account 101 is linked to the monies 103 and is used to complete all debits and credits in the arrangement of FIG. 1. In an example wherein primary account 101 is a credit card, monies 103 represents the payment facilities of the issuing bank. In an example wherein primary account 101 is an electronic wallet from a payment service, such as PayPal™, monies 103 represent the underlying bank account, credit account, or other facility used to clear the payments to/from primary account 101. However, the scope of embodiments is not limited to credit cards and electronic wallets as primary accounts. Rather, the scope of embodiments may include any appropriate account, such as those accessed by debit cards or the like.

Continuing with FIG. 1, proxy accounts 102*a-f* are linked to the primary account 101, using primary account 101 as a payment method for deposits and withdrawals. Thus, when a payment is made to proxy account 102*a*, or proxy account 102*a* makes a payment, the transaction is cleared through primary account 101, as the source of, and destination for, the money in the transaction. Further, credentials for each of the primary accounts 102 are different from each other and from that of primary account 101.

Proxy accounts 102 are not linked directly to monies 103. Instead, proxy accounts 102 are linked to primary account 101. In one example, wherein primary account 101 is an electronic wallet that provides access to a bank account (as monies 103), payment is made to/from proxy account 102 using primary account 101, and the counterparty may be unaware of the existence of the bank account. In fact, the counterparty may be unaware of the existence of primary account 101 in an example wherein the credentials of primary account 101 are kept from the counterparty.

In another example in which primary account 101 is a credit card, the counterparty is unaware of the primary account's credit card number or of the payment facility of the underlying issuing bank. Also, the proxy account credentials are not valid credentials to access the payment facilities of the issuing bank, as the payments are made through primary account 101.

Thus, the arrangement of FIG. 1 provides at least one degree of separation between proxy accounts 102 and primary account 101, and proxy accounts 102 do not have credentials to directly access monies 103. Thus, the arrangement of FIG. 1 isolates primary account 101 and monies 103 from counterparties, thereby providing an enhanced level of security to the owner of the accounts 101, 102.

In various embodiments an owner creates and manages accounts 101, 102 using a computer to login to a network-based facility. Once the owner is confirmed by the security measures of the payment service, the owner is presented with an interface (e.g., a web-based Graphical User Interface (GUI) or other type of interface) to create and manage accounts.

Figure 2:
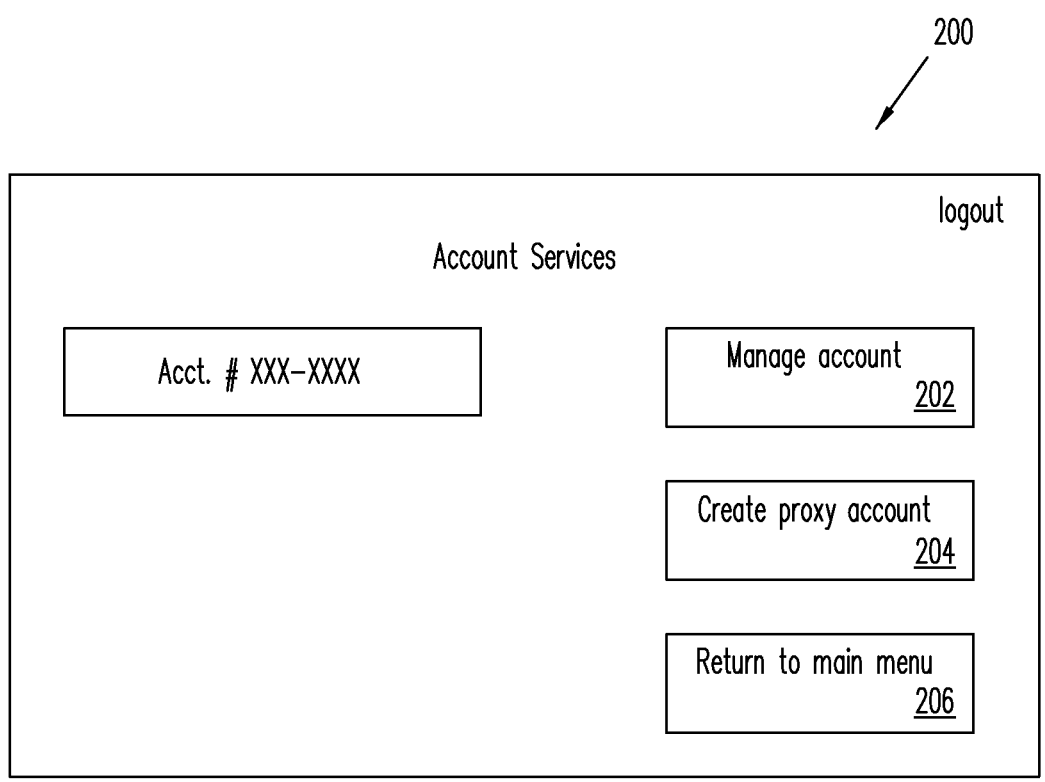
FIGS. 2, 3, 4, 5, 6, and 7 illustrate an example user interface of an example application program according to various aspects of the present disclosure.

FIG. 2 illustrates an example user interface 200 for an electronic device adapted according to one embodiment. In the illustrated embodiment, the electronic device may include a smart phone or other hand-held device. In alternative embodiments, the electronic device may be another suitable electronic device such as a computer tablet or laptop/desktop personal computer. The owner may access interface 200 through a web browser, a specialized application, or other appropriate technique. For instance, a user may download application software programs, also known as "apps" or "applications" to the portable electronic device. In general, applications are computer software programs designed to execute specific tasks. As examples, Apple's® App Store, Microsoft's Windows® Store, and Google's® Android Market offer a multitude of applications, including entertainment programs, business applications, file management tools, and other widgets, etc.

Interface 200 is an example of an interface seen by the owner when the owner creates one or more proxy accounts that link to a primary account (as in FIG. 1). Interface 200 may be embodied in any appropriate manner, such as on a touch screen interface or another GUI that uses a mouse or other pointing device. In this example, the various buttons, fields, and some of the text is created using hypertext or other interactive code to allow the user to perform actions with the items on the screen.

FIG. 2 starts off after the owner has already created a primary account, and it is understood that an interface similar to interface 200 could be used to create a primary account as well. The illustration of FIG. 2 begins at an Account Services page that references the primary account, which for purposes of this example is given number XXX-XXXX. The owner is presented with three options, each associated with one of buttons 202, 204, 206. By selecting button 202, the owner can manage the primary account, such as by changing a billing address, password, or the like. Button 206 allows the owner to return to a main menu (not shown).

Figure 3:
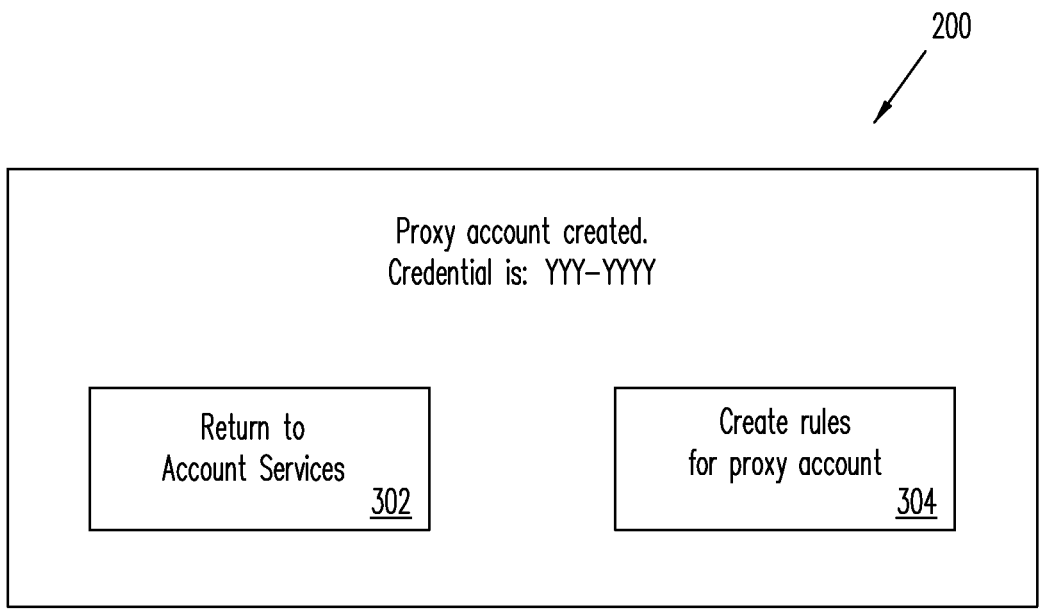

Button 204 triggers the payment service to generate a proxy account that is linked to primary account XXX-XXXX. In some examples, the owner can select credentials for the proxy account (e.g., by generating an account number or login), but in this example, the service generates the credentials. FIG. 3 is an illustration of an example screen in interface 200 showing that the service has created proxy account YYY-YYYY. In FIG. 3, the owner can return to Account Services by selecting button 302. The owner can also create rules for the proxy account by selecting button 304.

Figure 4:
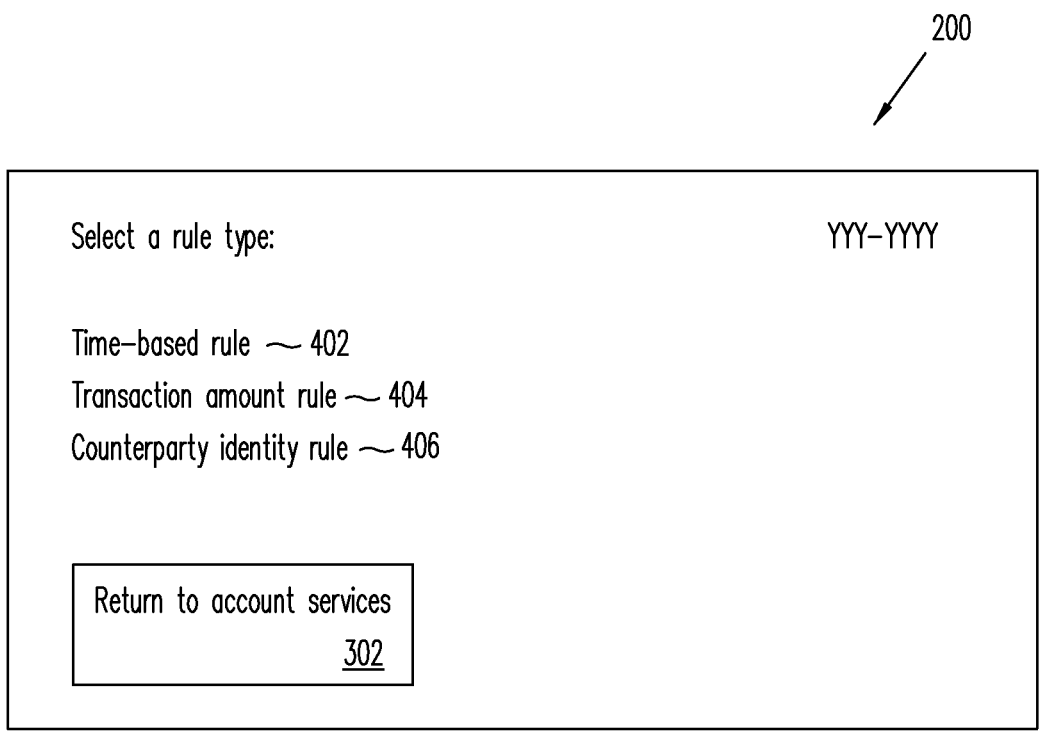

Upon selecting button 304, the owner is taken to the screen shown in FIG. 4. The screen of FIG. 4 provides a utility for the owner to create rules to apply to the proxy account. The user can select the text in either options 402, 404, 406 to create a specific rule to apply to the proxy account.

The option shown in text 402 provides for a time-based rule, such as a maximum lifetime for the proxy account. The option shown in text 404 provides for a transaction amount rule (e.g., a maximum amount to transactions to/from the proxy account). Similarly, the option shown in text 406 provides for a counterparty identity rule (e.g., allowing transactions with one or more pre-selected counterparties). Each of these options are described in more detail with respect to FIGS. 5-7.

It should be noted, though, that the options shown in FIG. 4 are illustrative only. The scope of embodiments can include any arbitrary rule for use of a proxy account. Examples of other rules include limiting the proxy account to a single transaction, limiting the proxy account to make payments only during certain pre-defined times, limiting the proxy account to only deposits or only withdrawals, limiting the proxy account for use only with counterparties in certain geographic regions, and the like.

Figure 5:
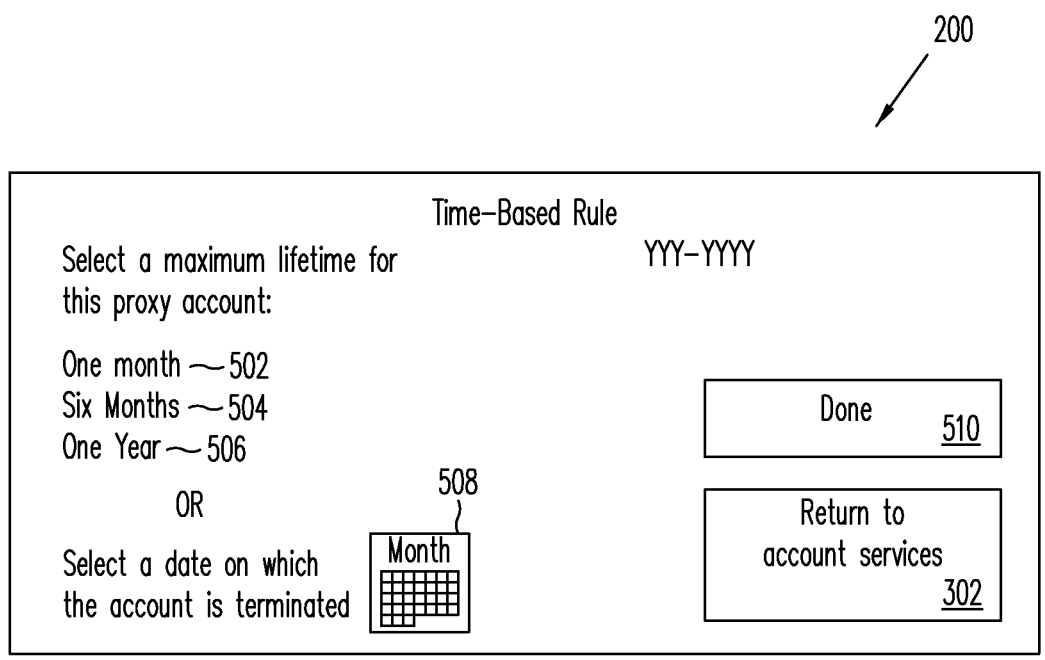

When the owner selects option 402, the service takes the owner to the screen shown in FIG. 5. Within the screen of FIG. 5, the owner can select from pre-defined account lifetimes of one month 502, six months 504, and one year 506. Alternatively, the user can select a specific date from calendar tool 508 on which to deactivate or cancel the proxy account. Once the owner provides a maximum lifetime, the owner may select button 510 to enter the selection.

Although not shown in FIG. 5, other events may be selected that, upon the occurrence of such event, the proxy account is deactivated or canceled. One example is detection of fraud or attempted use outside of the established rule set. Another example includes a pre-defined elapsed time with no activity. Such rules may be default rules or may be selected, and other appropriate events may trigger deactivation or cancelation as well.

Figure 6:
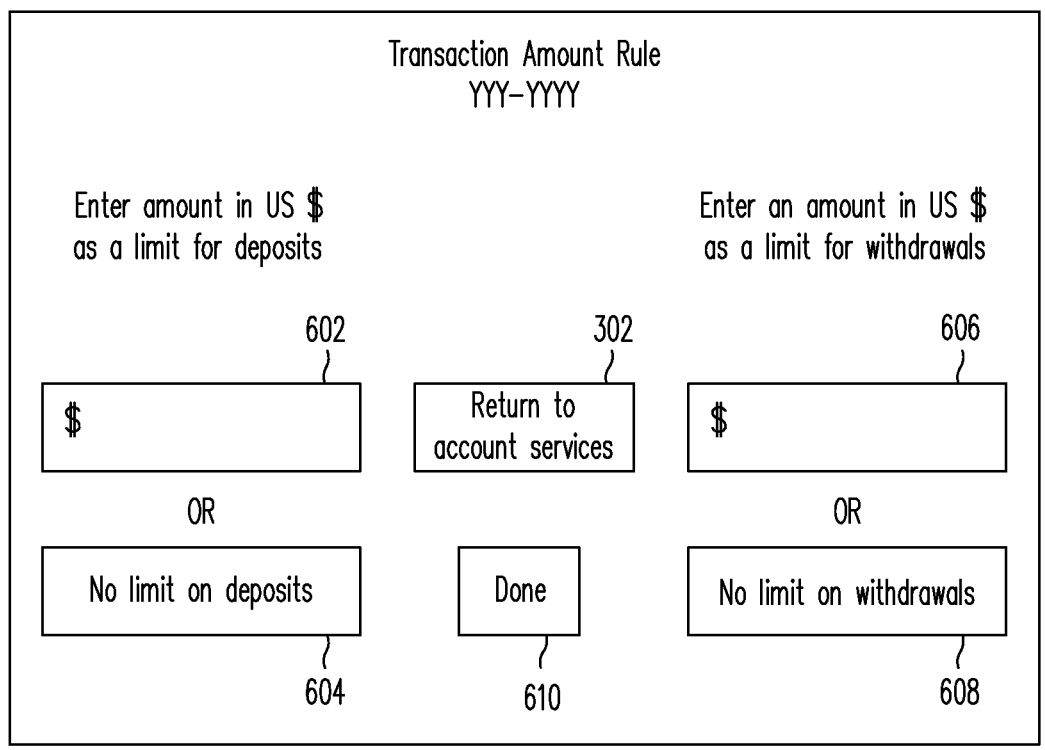
Figure 7:
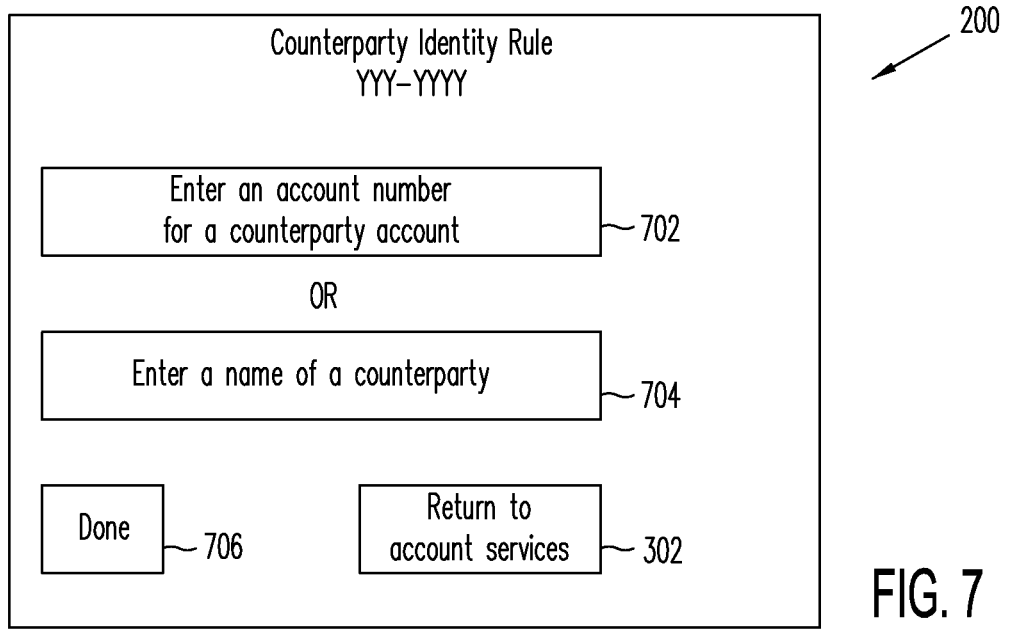

Returning to FIG. 4, when the owner selects option 404, the service takes the owner to the screen of FIG. 6 to define transaction amounts for the proxy account. The owner may use field 602 or button 604 to enter, if desired, a transaction amount limit for deposits. Similarly, the owner may use field 606 and button 608 to enter, if desired, a transaction amount for withdrawals. The user may select the done button 610 to enter the selection.

The screen of FIG. 6 is shown as providing an opportunity to enter a per-transaction amount for the proxy account. However, other embodiments may also define a total lifetime amount for transactions using the proxy account. Any appropriate rule to limit an amount of money, whether per-transaction, cumulative over a span of time, or otherwise are within the scope of embodiments.

Returning to FIG. 4, the owner may choose option 406 to set up a rule identifying a counterparty. Upon selection of option 406, the service takes the owner to the screen shown in FIG. 7. There are various ways to identify a counterparty, with two of those ways being by identifying an account number associated with the counter party and a name of the counterparty. The owner may use fields 702, 704 to enter an identification of a counterparty and select button 706 to enter the information. However, any appropriate technique for identifying a counterparty is within the scope of embodiments. Upon identification of a counterparty, the proxy account is limited to use with that counterparty only until specified otherwise by the account owner.

In some instances, an account is, by default, limited for use with the first payee or payor counterparty to a transaction employing the proxy payment account. Thus, rather than having to enter counterparty identification information in the screen of FIG. 7, the owner may simply create the proxy payment account and then use the proxy payment account to either send or receive payment to/from a given counterparty, thereby automatically associating the proxy payment account with the identity of the counterparty. Should the owner desire to use the same proxy payment account with a different counterparty the owner may go back to the payment service and use an interface, such as interface 200, to amend the rule to allow additional counterparties.

FIGS. 2-7 are shown as an illustrative example, other embodiments may provide screens to create more than one proxy account, to attach more than one rule to a given proxy account, and to attach a given rule to more than one proxy account. The scope of the disclosure provides for attaching any appropriate rule, or set of rules, to any number of proxy accounts to suit an account owner's purpose.

Figures 8, 9:
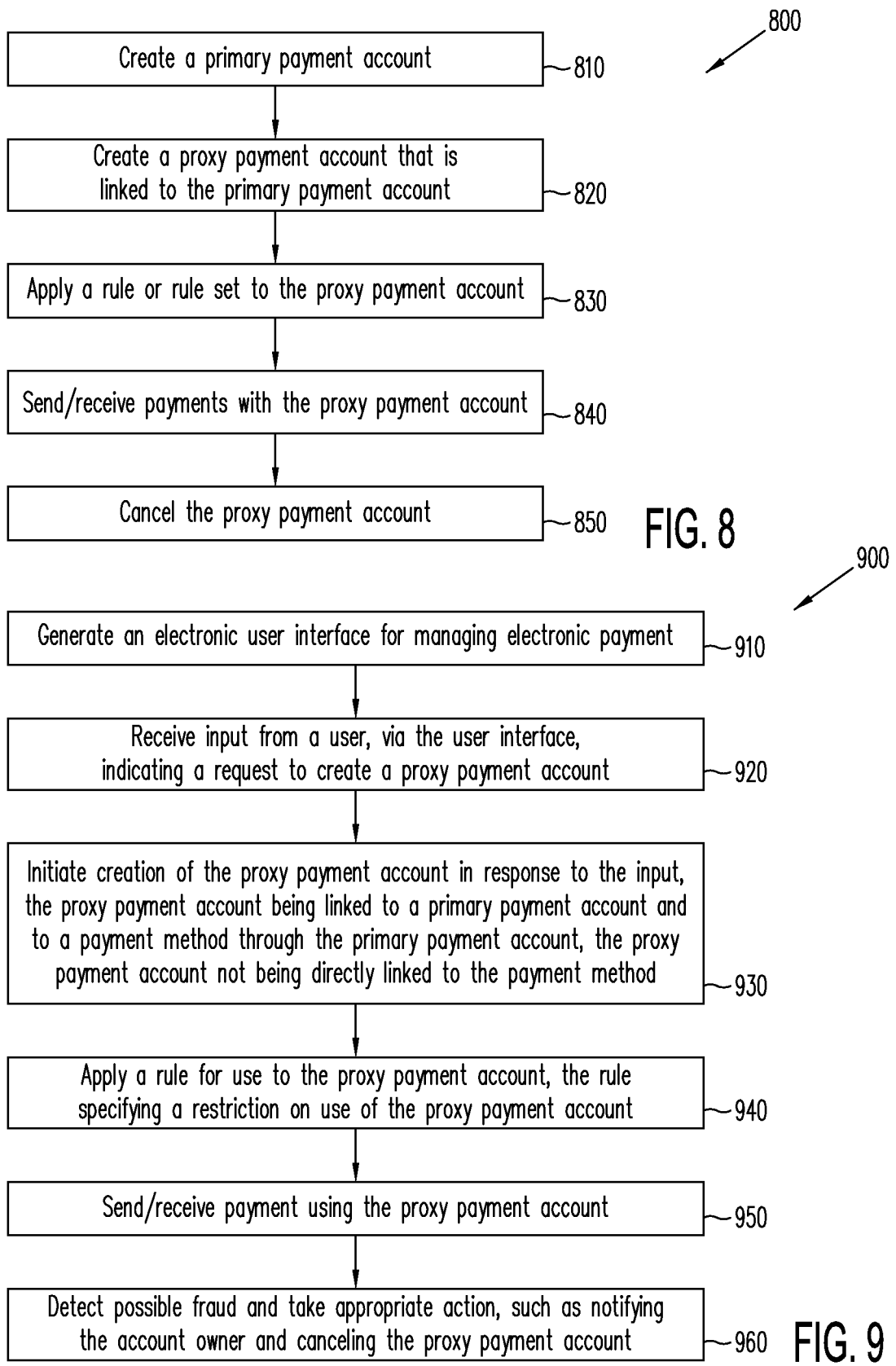
FIGS. 8 and 9 illustrate a flowchart containing example process flows according to various aspects of the present disclosure.

Various embodiments include methods for managing payment using a primary account and a proxy account. FIG. 8 illustrates method 800, adapted according to one embodiment, for a user to manage payment according to the principles discussed above in FIGS. 1-7. In one example, the user employs one or more computers and the interface 200 (FIGS. 2-7) when acting according to method 800.

At block 810, the owner creates a primary payment account. An example primary account is described above at FIG. 1.

At block 820, the owner creates a proxy payment account that is linked to the primary payment account. Example proxy payment accounts are described above at FIG. 1. The owner may create the primary payment account and the proxy payment account in the same web session or application session or a different session. In other words, the scope of embodiments also includes a scenario wherein the owner creates a proxy payment account to link to a primary payment account that has been preexisting for a significant amount of time.

At block 830, the owner applies a rule or rule set to the proxy payment account. An example of applying rules to the proxy payment account is given above at FIGS. 2-7.

At block 840, the owner sends and/or receives payments with the proxy payment account. As explained above, the proxy payment account has different credentials than the primary payment account and is not directly linked to the monies, thereby keeping the primary account and the true method of payment secret from the counterparties interfacing with the proxy payment account. Further, as explained above, the actions of block 840 are carried out consistently with the rule or rule set applied to the proxy payment account. In this example, payment is electronic and accomplished by computers, and thus, the rules are applied automatically by the payment service as the transaction is carried out (or is attempted to be carried out).

In block 850, the owner cancels the proxy payment account. In one example, the owner is notified of possible fraud and cancels the proxy payment account in response thereto. In another example, the owner has set a rule in block 830 to automatically cancel the account after a specified event or time, and the payment service applies the rule automatically absent further instruction by the owner.

The scope of embodiments is not limited to the particular flow shown in FIG. 8. Rather, other embodiments may add, omit, rearrange, or modify one or more actions in accordance with a given design. For instance, the owner may create more than one proxy account and apply any appropriate rules to some or all of the different proxy accounts.

FIG. 9 is an illustration of method 900, adapted according to one embodiment, to manage electronic payment accounts. The actions of FIG. 9 may be performed electronically by a payment service (e.g., a service providing an electronic payment, such as PayPal™, an issuing bank for a credit card or debit card, and/or the like). In some embodiments, the various actions are carried out by one or more computer processors executing computer code to provide the described functionality.

In block 910, the service generates an electronic user interface for managing electronic payment. An example user interface is shown as interface 200 in FIGS. 2-7. The interface allows an owner of a primary payment account to manage the primary account, including to generate one or more proxy payment accounts.

In block 920, the service receives input from a user, via the user interface, indicating a request to create a proxy payment account. The payment service may receive the input over the Internet or other computer network.

In block 930, the payment service initiates creation of the proxy payment account in response to the input. The proxy payment account is linked to the primary payment account and to a payment method through the primary payment account but is not directly linked to the payment method. An example proxy payment account is described above with respect to FIG. 1. Block 930 may further include generating account information, such as an account number, a login, and/or the like.

In block 940, the payment service applies a rule to the proxy payment account. As described above with respect to FIGS. 2-7, the rule sets out a limitation on use of the proxy payment account.

It should be noted that the actions of blocks 910-940 may be carried out in conjunction with a human user at a computer-based device interacting with the interface. In one example, the interface is provided by a website rendered on a web browser or by an application on a personal computer or smartphone. The human user interacts with the payment service, directing the payment service to create the proxy account, create rules, process payments, etc.

In block 950, the payment service facilitates payment processing using the proxy account. In one example, a counterparty presents the proper credentials to send/receive payment using the proxy account. The payment service is aware that the proxy payment account is linked to the primary payment account, and the payment service clears the transaction by depositing or withdrawing an amount of money using the primary payment account. The payment service does not, in this example, provide information to the counterparty indicating the existence of the primary payment account or the specific underlying payment facility.

Block 950 may further include keeping records for the owner that show the transactions totaled at the primary payment account and also booked at the proxy payment account.

Block 960 includes detecting possible fraud. One example of detecting possible fraud includes using conventional fraud detection algorithms currently used by credit card-issuing banks to detect fraud. Another example includes detecting possible fraud anytime there is an attempt to use the proxy payment account inconsistent with any of the rules applied to the proxy payment account. Any technique to detect possible fraud, now known or later developed, may be applied in various embodiments.

Block 960 also includes taking appropriate action. In one example, the payment service notifies the owner of the account of possible fraud and also gives the owner a chance to respond and either confirm that there is no fraud or indicate that there might be fraud. Appropriate action may also include canceling the proxy payment account with or without instruction from the account owner to do so. Any appropriate action is within the scope of embodiments.

The scope of embodiments is not limited to the particular flow shown in FIG. 9. Rather, other embodiments may add, omit, rearrange, or modify one or more actions in accordance with a given design. For instance, method 900 may include creating and managing multiple proxy payment accounts, each with any arbitrary number of rules applied thereto.

Various embodiments may provide one or more advantages over conventional techniques. For instance, the separation between the primary payment account and the proxy payment account, and the lack of knowledge by the counterparty of the primary payment account, provides security to the account owner by limiting the chance that the primary payment account might be compromised. Furthermore, the ability to set rules may prevent unauthorized or fraudulent payment altogether by limiting payment to certain transactions and/or to certain counterparties. At the very least, setting rules for use of the proxy payment account may limit any damage to the primary account by limiting the proxy account to a specific amount of money. An account owner may enjoy both flexibility and security by creating proxy payment accounts and applying appropriate rule sets thereto.

Furthermore, in a scenario wherein one proxy payment account is used per counterparty, canceling and replacing the proxy payment account may include canceling and replacing only a single proxy payment account for one counterparty. Such process may be simpler than replacing account information at a multitude of different counterparties, as is done currently when a credit card is compromised.

In a further embodiment using proxy accounts, a user pays a merchant at a Point of Sale (POS) using a proxy account. For instance, when at a POS location, a proxy account may be used via smartphone using any appropriate payment technology, such as Near Field Communication (NFC) and the like. In some implementations rules for usage may also be bundled with proxy account credentials for further restrictions on the use of such proxy accounts.

Figure 10:
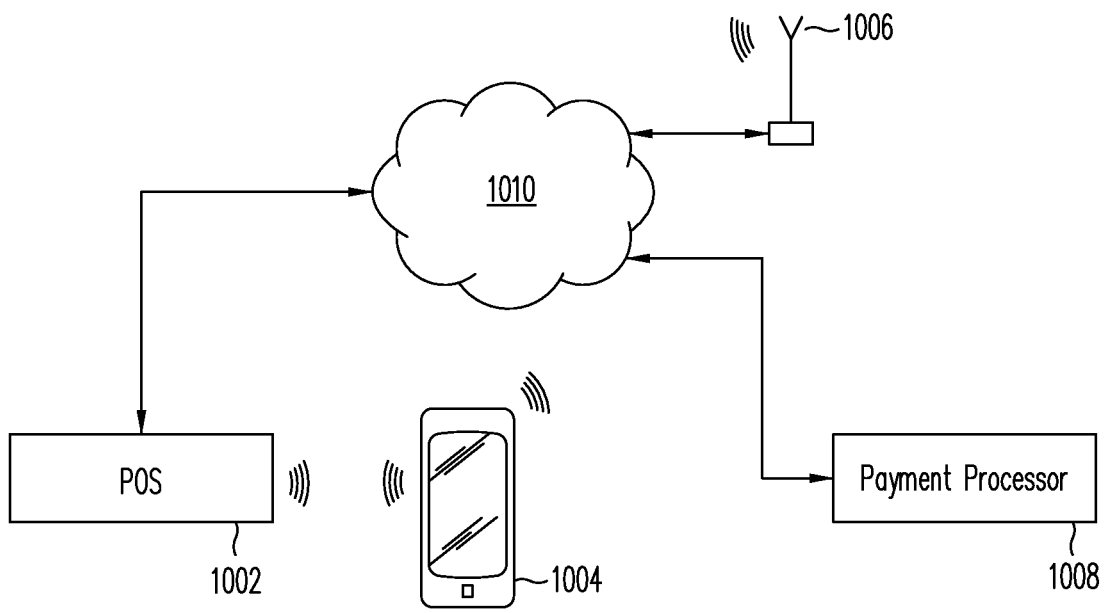
FIG. 10 illustrates an example system for making a payment at a POS.

FIG. 10 is a simplified diagram of an example system using proxy accounts for payments from mobile device 1004 to POS 1002. As shown in FIG. 10, mobile device 1004 uses a wireless technology to communicate with POS 1002 to provide proxy account credentials thereto to complete payment for a transaction. POS 1002 then communicates with payment processor 1008 (e.g., a payment service such as PayPal™ or a bank, in the case of a proxy account associated with a credit card) to receive the money when the payment processor 1008 clears the transaction.

Further, as shown in FIG. 10, mobile device 1004 can communicate via network 1010 (e.g., the Internet, a cellular network, and/or the like) wirelessly. Mobile device 1004 is shown communicating through wireless base station 1006, which may be a Wi-Fi access point, a cellular tower, or other facility.

Proxy account credentials (e.g., account numbers, security codes, user identifiers, etc.) can be generated and delivered to mobile device 1004 at any appropriate time. For instance, generation of proxy account credentials may occur at time of sale using internet connectivity of mobile device 1004. In another example, proxy account generation may occur at a previous time when a network connection to mobile device 1004 was available, so that a network connection at POS 1002 is not necessary. In such an embodiment, proxy account credentials can be created and batched on mobile device 1004 for subsequent off-line use. The following is an example use illustration of a embodiment that generates proxy credentials and stores the credentials locally on a mobile device for later use.

When mobile device 1004 has a network connection either by Wi-Fi or cell phone carrier, an application on mobile device 1004 can request payment processor's 1008 servers to generate X number of proxy account credentials. As in the previous examples, no information in the credentials specifies a relationship to a primary account. Credential information is unique, and a relationship to a primary account is derived by searching a database at payment processor 1008 that is not publicly exposed. Furthermore, in some embodiments, the proxy accounts created may be automatically associated with various rules for usage that are appropriate for a mobile caching application. For instance, the created proxy accounts may be stipulated as single-usage, for use at a POS and cannot be used again for withdrawal (except for a refund from the same merchant). In other embodiments, the proxy accounts, the credentials of which are batched on the mobile device, may have more or fewer restrictions or even different restrictions as appropriate.

The X number of proxy account credentials are stored locally on mobile device 1004 in encrypted form only readable by the particular mobile application running on mobile device 1004. When a proxy account is used, the mobile application marks locally the usage of that proxy account with some metadata, such as information stating that the proxy account has already been used, at a certain time, and with a certain retailer, for a particular amount.

Figure 11:
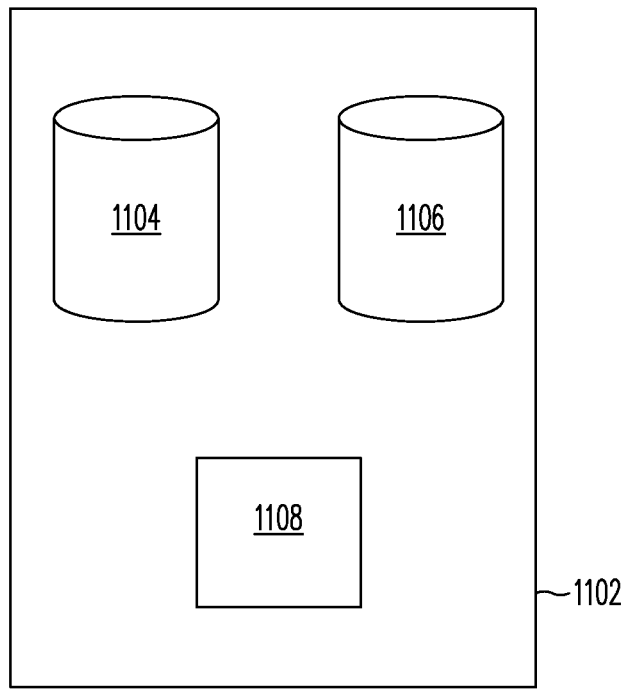
FIG. 11 illustrates an example mobile application for making payment at a POS.

FIG. 11 is an illustration of example application 1102, which is running on a mobile device (such as mobile device 1004 of FIG. 10) and batches proxy account credentials. Repository 1104 stores proxy account credentials, and repository 1106 stores metadata for used proxy accounts. Module 1108 uses proxy account credentials from repository 1104 to pay for transactions and then generates metadata in repository 1106 after a proxy account has been used. In this manner, application 1102 pays at the POS using proxy account credentials and manages metadata for use of the proxy accounts. Application 1102 can also be used in embodiments wherein proxy account credentials are downloaded from a network at the POS during the transaction as well as with batched-credential embodiments.

If the store of available proxy accounts in repository 1104 falls below a certain threshold of Y available accounts, module 1108 schedules retrieval of additional available accounts from the servers of payment processor 1008 (FIG. 10), either as a background task or explicitly asking the user for permission to request refresh of accounts. In some embodiments, the number of account credentials that are generated and provided to mobile application 1102 is large enough that the user is not burdened by too frequent proxy account refreshing.

In some instances, mobile application 1102 can provide more flexibility to the user in terms of rules of use. In some examples, a user can request additional or different rules to be placed on proxy accounts at time of usage or before the time of usage (such as shown in FIGS. 4-7). In some examples, a user can set rules to be applied automatically if a recognized merchant is identified as the counterparty for a transaction. Application 1102 can allow for changes in default server created rules, such as amount allowed, expiration period, reuse parameters, and the like.

In some instances, the rules themselves can be indicated in proxy account credentials, encrypted with a key either specific to the primary account or specific to the proxy account. Such a feature allows rules to be generated without informing payment processor 1008 beforehand. In other implementations, the rules may be tracked by payment processor 1008, having been previously informed. In fact, any appropriate technique to apply and/or track rules may be used in various implementations.

Figure 12:
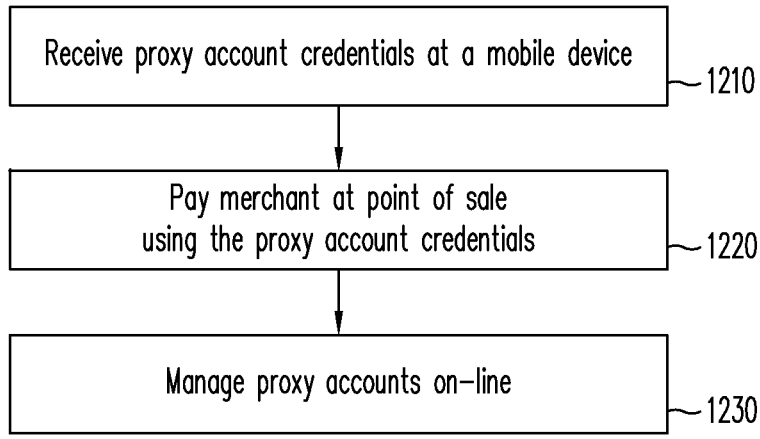
FIGS. 12 and 13 illustrate example methods to make payment at a POS and manage proxy accounts at a mobile device.

FIG. 12 is an illustration of method 1200, adapted according to one embodiment, to manage electronic payment accounts and to conduct transactions at a POS using proxy accounts. Method 1200 may be performed in some embodiments by a mobile application running on a mobile device, such as mobile device 1004 of FIG. 10.

In block 1210, the mobile device receives account credentials. In some instances, the mobile device may receive the account credentials during the transaction and while at the merchant's POS over a network from the payment processor. For example, the mobile device may request account credentials from the payment processor during the transaction and receive the credentials in response to the request on-the-fly and in an elapsed time that is appropriate for a transaction.

In another example, the mobile device may receive the account credentials over the network and then store the account credentials for later use. In this scenario, the mobile application stores the account credentials in a secure manner and then presents the account credentials at an appropriate time. In such a scenario, the mobile application may automatically (or manually in response to user input) exchange data with the payment processor about available proxy accounts and metadata about usage of proxy accounts as a network connection becomes available.

In any event, the proxy account credentials are received by the mobile device in a secure manner. For instance, the credentials may be delivered in an encrypted form and then stored in the same or a different encrypted form.

In block 1220, the mobile application pays a merchant at a POS using the proxy account credentials. The user may interact with the mobile application through any appropriate electronic interface. The proxy account credentials can be transferred from the mobile device to the POS using any appropriate technology, such as by NFC or encrypted Wi-Fi. The merchant's POS then presents the credentials to the payment processor to verify the credentials and receive payment. In some instances, the actions of block 1220 are performed quickly enough that it is significantly in "real-time" from the perception of a human consumer.

Block 1220 may further include the mobile application writing metadata to repository 1106 (FIG. 11) to indicate that a particular proxy account has been used. The number of unused proxy accounts is then decreased by one. In some embodiments, the used proxy account may be designated as single-use-only, perhaps by a default rule. In such case, the particular proxy account may be indicated as retired using metadata. In other instances, the particular proxy account may be usable more than once, perhaps for a specified number of times or only at a specified merchant. In such cases, the metadata may indicate that the account has been used but it is not necessarily retired.

In block 1230, the mobile application allows the user to manage the proxy accounts on-line. For instance, in some embodiments, mobile application 1102 provides an interface, such as that shown in FIGS. 2-7, to a human user. The human user then may manage settings, such as default rules for locally-batched or mobile-downloaded accounts. In some instances, the user may set rules during a transaction or at a different time. Some embodiments may also allow a user to review payments and manually prompt the download of additional account credentials from the mobile interface.

In a example use scenario, the user has a mobile application running on a mobile device. The user may interact with the mobile application to download account credentials, such as by using a touch screen interface or other interface to cause the mobile application to send a request for account credentials to the payment processor. Additionally or alternatively, the mobile application itself may automatically request one or more account credentials from the payment processor as appropriate. In such examples, the mobile application may include an identifier of the user in the request so that the payment processor may verify that the request is proper and may track proxy account creation locally.

The user goes to a brick and mortar store that has a point of sale, and the user brings a mobile device that runs a mobile application that provides proxy account payment/management functionality. The user approaches the POS to pay for a transaction. In an NFC scenario, the mobile application causes a transceiver of the mobile device to communicate with the POS, receiving the transaction amount and merchant identification from the POS and providing proxy account credentials to the POS authorized for the transaction amount. The POS then provides the account credentials and transaction amount to the payment processor for verification along with an identification of the merchant sufficient to route money from the payment processor to an account of the merchant. The payment processor verifies the payment (if appropriate), schedules payment to the merchant, and provides a verification to the POS. The POS then communicates with the mobile application to indicate that the transaction is complete.

Figure 13:
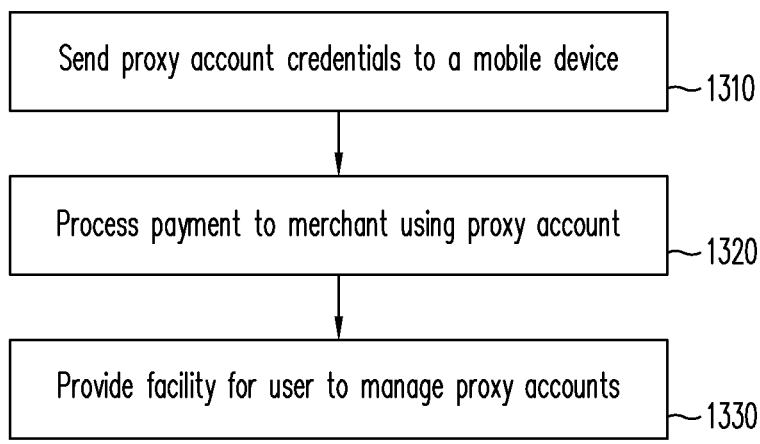

FIG. 13 is an illustration of method 1300, adapted according to one embodiment, to manage electronic payment accounts and to conduct transactions at a POS using proxy accounts. Method 1300 may be performed in some embodiments by a program at one or more computers of a payment processor, such as payment processor 1008 of FIG. 10.

In block 1310, the computer sends proxy account credentials to a mobile device. In some instances, the computer may send a batch of account credentials to the mobile device to cache and use offline. In other embodiments, the computer may send one or more account credentials during a transaction that the mobile device is facilitating. The computer may send the proxy account credentials in response to a request from the mobile application and/or may push proxy account credentials to the mobile application as appropriate. In some examples, the mobile application presents identifying information (e.g., user account/password, primary account credentials, and/or an encryption key) to the payment processor so that the payment processor may create proxy accounts for the correct primary account and also verify that the mobile application is genuine to prevent fraud.

Furthermore, in some embodiments, the computer may send the account credentials in an encrypted or otherwise secure form over a wireless or wired network, such as over the Internet and/or through a cellular network. In any event, the computer may send the proxy account credentials in response to a prompt by the mobile device or in response to any other stimulus.

In block 1320, the computer processes a payment to a merchant using a proxy account. For instance, when the merchant receives the proxy account credentials from the mobile application, the merchant may forward those credentials, the transaction amount, and an identifier of the merchant to the payment processor in order to receive payment therefrom. The payment processor analyzes the proxy account credentials, and if valid and in accordance with applicable rules, the payment processor then provides a verification to the merchant and schedules a transfer of money to the merchant. In some instances, the payment processor may verify that the primary account has sufficient funds to cover the transaction. As described above, at the payment processor the payment is cleared through a primary account or other payment facility that is linked to the proxy account but not known to the merchant. The payment processor may transfer money to the merchant using identifying information from the merchant, such as a bank routing number or other information.

In some instances, the user may be enrolled in a scrip program. An example is when a store teams with a school for a school fundraiser, wherein a portion of sales from scrip participants at the store goes to the school. In order to facilitate scrip participation, the user may notify the payment processor that its payment to a particular merchant should be linked to a particular scrip program. The payment processor saves this information in a database, and when the user makes a payment to the merchant, the payment processor notifies the merchant and/or the scrip program to ensure that the transaction is properly linked to the scrip program.

In block 1330, the payment processor provides a facility for the user to manage proxy accounts. For instance, in some embodiments, the payment processor allows access to the account management features through an interface, such as that shown in FIGS. 2-7, to a human user. The human user then may manage settings, such as default rules for locally-batched or mobile downloaded accounts.

The scope of embodiments is not limited to the actions shown in FIGS. 12 and 13. For instance, other embodiments may add, omit, modify, or rearrange any actions. In one example, other embodiments may allow for any communication between and among the payment processor, the mobile application, and the merchant as appropriate to facilitate a transaction.

Embodiments adapted for use at POSs may provide various advantages. For instance, in the context of Automatic Teller Machines (ATMs), thieves may use skimmers to capture card numbers and Personal Identification Numbers (PINs) from users often without being caught. A skimmer is often a façade placed over an ATM that looks unsuspicious yet has magnetic-reading and optical capture technology. As POS payments become more popular, e.g., using NFC, the presentation of user account credentials may become a target of skimming technology. However, proxy accounts that can be limited to a single merchant and/or to a single transaction deny the skimmers credentials that can be useful elsewhere or at a later time.

Figure 14:
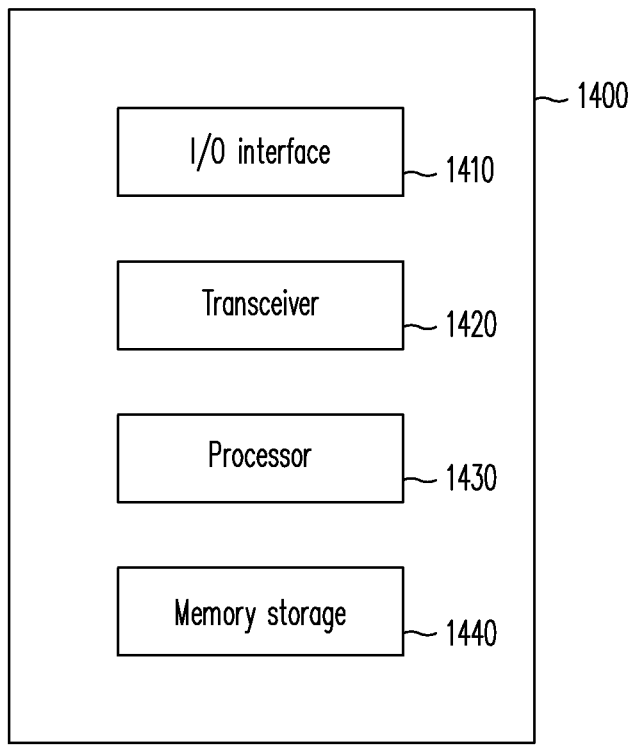
FIG. 14 illustrates a block diagram of a computer system for implementing various methods and devices described according to various aspects of the present disclosure.

FIG. 14 is a simplified block diagram of an example electronic device 1400 on which the account owner may interact with the POS and/or the payment service according to various aspects of the present disclosure. The electronic device 1400 may be a portable personal electronic device, such as a smart phone, laptop, or a tablet. The electronic device 1400 may also be a more powerful computer, for example a server computer. The electronic device 1400 includes an input/output interface 1410. The interface 1410 is operable to receive an input from a user and communicate an output to the user. In an embodiment, the input/output interface 1410 includes a visual display unit, for example a touch-sensitive screen. Input/output interface 101 may display a graphical interface, such as interface 200 of FIGS. 2-7.

The electronic device 1400 includes a transceiver 1420. The transceiver 1420 is operable to electronically communicate with external devices. In an embodiment, the transceiver 1420 is operable to wirelessly communicate with a POS, cellular towers, or other network access points and infrastructure. The electronic device 1400 also includes a computer processor 1430 that is operable to execute computer instructions and a memory storage 1440 that is operable to store the computer instructions.

The memory storage 1440 also contains a program module that is an embodiment of the application that interacts with the POS, the account owner, and/or the payment service. The program module operates to provide action such as receiving owner input to create a proxy payment account.

Figure 15:
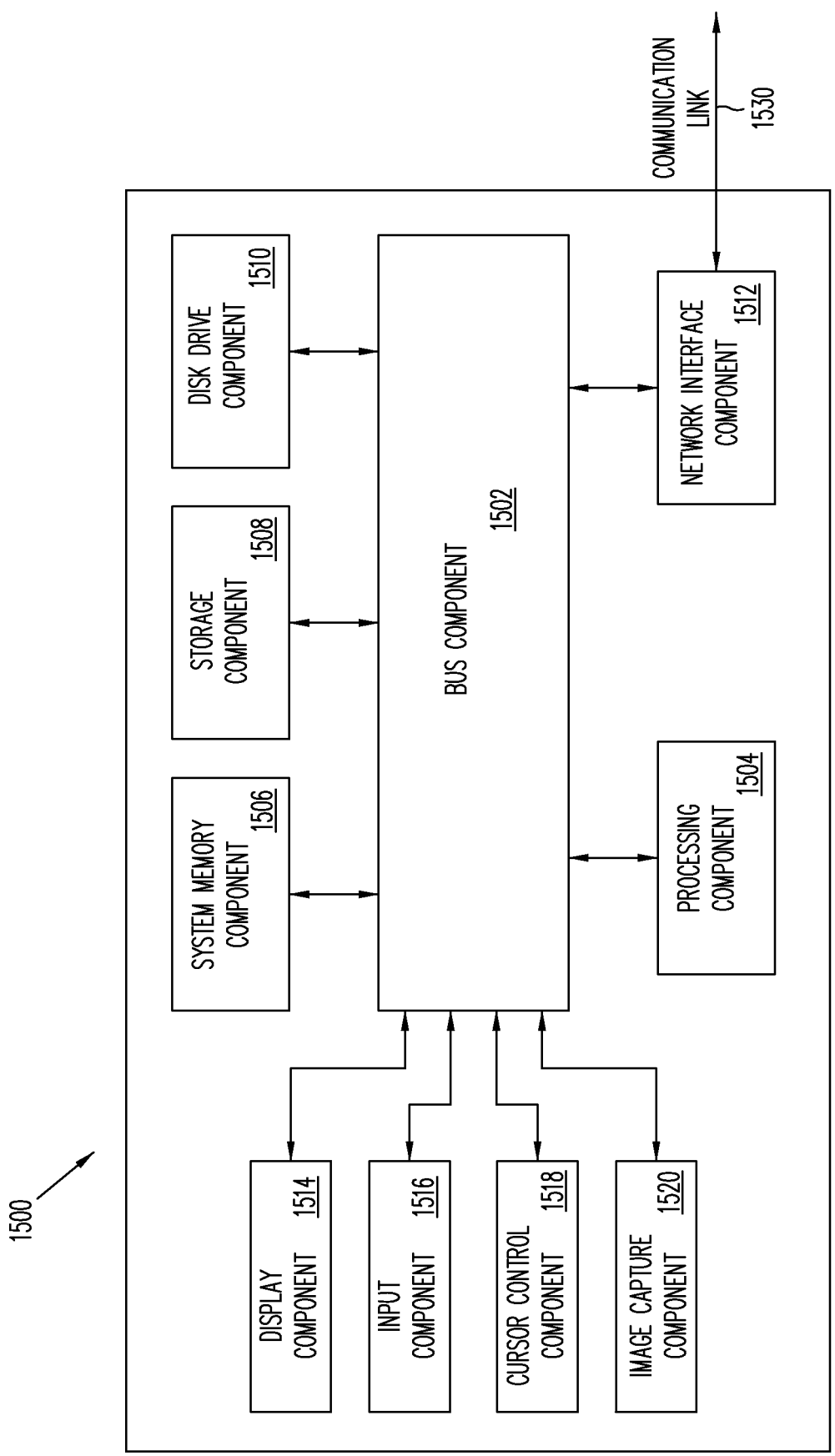
FIG. 15 illustrates a block diagram of a computer system for implementing various methods and devices described according to various aspects of the present disclosure.

FIG. 15 is a block diagram of a computer system 1500 suitable for implementing various methods and devices described herein, for example, the various method blocks of the methods 800, 900, 1200, and 1300. For example, the computer system 1500 may represent a computer upon which the account owner sees interface 200 and/or make a payment at a POS. In another example, the computer system 1500 may represent a server computer or other type of computer that can be used as part of an account management or payment processing infrastructure at a payment service. Accordingly, it should be appreciated that each of the devices may be implemented as the computer system 1500 for communication with a network in a manner as follows.

In accordance with various embodiments of the present disclosure, the computer system 1500, such as a mobile communications device and/or a network server, includes a bus component 1502 or other communication mechanisms for communicating information, which interconnects subsystems and components, such as processing component 1504 (e.g., processor, micro-controller, digital signal processor (DSP), etc.), system memory component 1506 (e.g., RAM), static storage component 1508 (e.g., ROM), disk drive component 1510 (e.g., magnetic or optical), network interface component 1512 (e.g., modem or Ethernet card), display component 1514 (e.g., touch-screens, cathode ray tube (CRT) displays, or liquid crystal display (LCD)), input component 1516 (e.g., keyboard or touch-sensitive components operable to detect a touch by a human body), cursor control component 1518 (e.g., mouse or trackball), and image capture component 1520 (e.g., analog or digital camera). In one implementation, disk drive component 1510 may comprise a database having one or more disk drive components.

In accordance with embodiments of the present disclosure, computer system 1500 performs specific operations by processor 1504 executing one or more sequences of one or more instructions contained in system memory component 1506. Such instructions may be read into system memory component 1506 from another computer readable medium, such as static storage component 1508 or disk drive component 1510. In other embodiments, hard-wired circuitry may be used in place of (or in combination with) software instructions to implement the present disclosure.

Logic may be encoded in a computer readable, non-transitory medium, which may refer to any medium that participates in providing instructions to processor 1504 for execution. Such a medium may take many forms, including but not limited to, non-volatile media and volatile media. In various implementations, non-volatile media includes optical or magnetic disks, such as disk drive component 1510, and volatile media includes dynamic memory, such as system memory component 1506.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 1500. In various other embodiments of the present disclosure, a plurality of computer systems 1500 coupled by communication link 1530 (e.g., a communications network, such as a LAN, WLAN, PTSN, and/or various other wired or wireless networks, including telecommunications, mobile, and cellular phone networks) may perform instruction sequences to practice the present disclosure in coordination with one another.

Computer system 1500 may transmit and receive messages, data, information and instructions, including one or more programs (i.e., application code) through communication link 1530 and communication interface 1512. Received program code may be executed by processor 1504 as received and/or stored in disk drive component 1510 or some other storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as computer program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

It should be appreciated that like reference numerals are used to identify like elements illustrated in one or more of the figures, wherein these labeled figures are for purposes of illustrating embodiments of the present disclosure and not for purposes of limiting the same.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. An electronic device, comprising:
a transceiver configured to electronically communicate with a computer network;
a non-transitory memory; and
one or more hardware processors coupled to the non-transitory memory, and configured to read instructions from the non-transitory memory to cause the electronic device to perform operations comprising:
initiating, over the computer network, a transaction at a Point of Sale (POS) device of a merchant;
receiving a request for an entry of a proxy account credential for one of a plurality of proxy payment accounts;
accessing the plurality of proxy payment accounts managed by a service provider and stored on the electronic device based on the proxy account credential, wherein the proxy payment accounts are linked to a primary payment account while not being linked directly to a payment instrument associated with the primary payment account, and wherein the proxy account credential authenticates a use of a first proxy payment account for the plurality of proxy payment accounts without revealing an authentication credential for the primary payment account;
receiving an authentication of the use of the first proxy payment account based on the proxy account credential;
accessing a rule stored with the plurality of proxy payment accounts and associated with the first proxy payment account based on the proxy account credential;
determining that the transaction is allowable by the rule;
conducting a payment at the POS with the first proxy payment account using the proxy account credential;
generating metadata for the first proxy payment account based on the conducting the payment, wherein the metadata comprises an indication that the first proxy payment account has been used for the payment;
writing the metadata to a repository of the electronic device associated with the first proxy payment account;
determining that the electronic device is communicatively connected to the service provider;
transmitting a request to a decrease a number of the plurality of proxy payment accounts based on the first proxy payment account being used for the payment, wherein the request comprises the metadata and the indication; and
receiving an update to the plurality of proxy payment accounts from the service provider based on the transmitting the request.

2. The electronic device of claim 1, wherein the operations further comprise:
receiving the plurality of proxy payment accounts, wherein the plurality of proxy payment accounts are received in a first encrypted format, and the plurality of proxy payment accounts are stored within the electronic device in a second encrypted format, the second encrypted format being different from the first encrypted format.

3. The electronic device of claim 1, wherein the operations further comprise:
requesting the plurality of proxy payment accounts and including, as part of the request, identifying information associated with the electronic device to authenticate the electronic device to the service provider.

4. The electronic device of claim 1, wherein the operations further comprise:
determining, after conducting the payment, an amount of unused proxy payment accounts;
determining that the amount is below a threshold; and
requesting, in response to the determining that the amount is below the threshold, a further plurality of proxy payment accounts.

5. The electronic device of claim 1, wherein the operations further comprise:
receiving a merchant identification from the merchant.

6. The electronic device of claim 5, wherein the operations further comprise:
identifying a recognized merchant operating the POS; and
applying the rule based on the received merchant identification for the recognized merchant.

7. The electronic device of claim 1, wherein the transceiver comprises a near field communication (NFC) transceiver.

8. A method, comprising:
receiving, at a first time at a processing server, a request for a proxy payment account from an electronic device, the request comprising data identifying a primary payment account to be linked to the proxy payment account;
generating, by the processing server, the proxy payment account configured to be stored by the electronic device, wherein the proxy payment account is configured to be linked to the primary payment account without identifying a payment instrument associated with the primary payment account, and wherein the proxy payment account comprises a proxy account credential that authenticates a use of the proxy payment account without revealing an authentication credential for the primary payment account;
transmitting, from the processing server, the proxy account credential for the proxy payment account to the electronic device, wherein the proxy account credential is configured to be stored by the electronic device and associated with a device side rule for usage of the proxy payment account while stored within the electronic device;
receiving the proxy account credential;
verifying the proxy account credential for the use with a transaction;
determining whether to process the transaction in response to the verifying;
receiving metadata written to a repository of the electronic device associated with the proxy payment account, wherein the metadata comprises an indication that the proxy payment account has been provided for the use for the transaction;
deactivating the proxy payment account based on the metadata;
decreasing a number of a plurality of proxy payment accounts associated with the proxy payment account based on the metadata; and
refreshing data associated with the plurality of proxy payment accounts stored on the electronic device based on the decreasing.

9. The method of claim 8, further comprising:
encrypting, by the processing server, the proxy account credential prior to transmitting.

10. The method of claim 8, further comprising:
associating the proxy account credential with a rule specifying a recognized merchant with which the proxy payment account may be used; and
transmitting the associated rule with the proxy account credential.

11. The method of claim 10, further comprising:
receiving the proxy account credential, as part of a payment authorization request for the transaction, from a Point of Sale (POS) that is associated with a first merchant;
comparing an identity of the first merchant to a list of recognized merchants; and
determining that the first merchant is an unrecognized merchant based on the comparing.

12. The method of claim 11, further comprising:
declining the payment authorization request; and
sending a notification of the declining to the electronic device, wherein the deactivating the proxy payment account is further based on the determining that the first merchant is an unrecognized merchant.

13. The method of claim 8, further comprising:
receiving a transaction amount associated with the transaction from a Point of Sale (POS) after the proxy account credential are provided to the POS from the electronic device during the transaction.

14. The method of claim 13, further comprising:
transmitting the verification of the proxy account credential and the transaction amount to the POS to complete the transaction.

15. A non-transitory machine-readable medium having stored thereon machine-readable instructions executable to cause a machine to perform operations comprising:
receiving, at a first time, a request for a proxy payment account from an electronic device, the request comprising data identifying a primary payment account to be linked to the proxy payment account;
generating the proxy payment account configured to be stored by the electronic device, wherein the proxy payment account is configured to be linked to the primary payment account without identifying a payment instrument associated with the primary payment account, and wherein the proxy payment account comprises a proxy account credential that authenticates a use of the proxy payment account without revealing an authentication credential for the primary payment account;
transmitting the proxy account credential for the proxy payment account to the electronic device, wherein the proxy account credential is configured to be stored by the electronic device and associated with a device side rule for usage of the proxy payment account while stored within the electronic device;
receiving the proxy account credential;
verifying the proxy account credential for the use with a transaction;
determining whether to process the transaction in response to the verifying;
receiving metadata written to a repository of the electronic device associated with the proxy payment account, wherein the metadata comprises an indication that the proxy payment account has been provided for the use for the transaction;
deactivating the proxy payment account based on the metadata;
decreasing a number of a plurality of proxy payment accounts associated with the proxy payment account based on the metadata; and
refreshing data associated with the plurality of proxy payment accounts stored on the electronic device based on the decreasing.

16. The non-transitory machine-readable medium of claim 15, wherein the operations further comprise:
associating the proxy account credential with a rule specifying a recognized merchant with which the proxy payment account may be used; and
transmitting the associated rule with the proxy account credential.

17. The non-transitory machine-readable medium of claim 16, wherein the operations further comprise:
receiving the proxy account credential, as part of a payment authorization request for the transaction, from a Point of Sale (POS) that is associated with a first merchant;
comparing an identity of the first merchant to a list of recognized merchants; and
determining that the first merchant is an unrecognized merchant based on the comparing.

18. The non-transitory machine-readable medium of claim 17, wherein the operations further comprise:
declining the payment authorization request; and
sending a notification of the declining to the electronic device, wherein the deactivating the proxy payment account is further based on the determining that the first merchant is an unrecognized merchant.

19. The non-transitory machine-readable medium of claim 15, wherein the operations further comprise:
receiving, from a Point of Sale (POS), a transaction amount associated with the transaction after the proxy account credential is provided to the POS from the electronic device during the transaction.

20. The non-transitory machine-readable medium of claim 19, wherein the operations further comprise:
transmitting the verification of the proxy account credential and the transaction amount to the POS to complete the transaction.

* * * * *